United States Patent
Feng et al.

(10) Patent No.: US 10,986,162 B2
(45) Date of Patent: Apr. 20, 2021

(54) IMPLEMENTING A BLOCKCHAIN-BASED WEB SERVICE

(71) Applicant: ALIPAY (HANGZHOU) INFORMATION TECHNOLOGY CO., LTD., Zhejiang (CN)

(72) Inventors: Zhiyuan Feng, Hangzhou (CN); Yanpeng Li, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/082,347

(22) Filed: Oct. 28, 2020

(65) Prior Publication Data
US 2021/0044647 A1    Feb. 11, 2021

Related U.S. Application Data

(63) Continuation of application No. PCT/CN2019/111451, filed on Oct. 16, 2019.

(51) Int. Cl.
*H04L 29/08* (2006.01)
*H04L 29/06* (2006.01)
*H04L 9/06* (2006.01)

(52) U.S. Cl.
CPC .......... *H04L 67/025* (2013.01); *H04L 9/0643* (2013.01); *H04L 63/10* (2013.01);
(Continued)

(58) Field of Classification Search
CPC ..... H04L 67/025; H04L 9/0643; H04L 63/10; H04L 67/1097; H04L 67/28; H04L 67/34; H04L 2209/38
See application file for complete search history.

(56) References Cited

U.S. PATENT DOCUMENTS

2018/0089256 A1   3/2018  Wright, Sr.
2019/0303623 A1   10/2019 Reddy et al.
(Continued)

FOREIGN PATENT DOCUMENTS

| CN | 108830720 | 11/2018 |
| CN | 109284466 | 1/2019 |
| CN | 109492380 | 3/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Arvin Eskandarnia
(74) *Attorney, Agent, or Firm* — Fish & Richardson P.C.

(57) ABSTRACT

Disclosed herein are methods, systems, and apparatus, including computer programs encoded on computer storage media, for implementing a blockchain-based web service. One of the methods includes receiving a web service request for web data by a blockchain network node of a blockchain network node and from a client device. The web service request is stored in the blockchain network node. The blockchain network node forwards the web service request to a smart contract deployed in a software container on the blockchain network node. The blockchain network node obtains an execution result from the smart contract in response to the web service request, and sends the execution result to the client device.

20 Claims, 8 Drawing Sheets

(52) U.S. Cl.
CPC .......... *H04L 67/1097* (2013.01); *H04L 67/28* (2013.01); *H04L 67/34* (2013.01); *H04L 2209/38* (2013.01)

(56) References Cited

U.S. PATENT DOCUMENTS

2019/0305957 A1    10/2019  Reddy et al.
2020/0193429 A1*   6/2020   Babar ................... H04L 9/0637

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2019/111451, dated Jul. 8, 2020, 7 pages.
Extended European Search Report in European Application No. 19834341.0, dated Jan. 19, 2021, 11 pages.

* cited by examiner

IMPLEMENTING A BLOCKCHAIN-BASED WEB SERVICE

CROSS-REFERENCE TO RELATED APPLICATIONS

This application is a continuation of PCT Application No. PCT/CN2019/111451, filed on Oct. 16, 2019, which is hereby incorporated by reference in its entirety.

TECHNICAL FIELD

This specification relates to implementing a blockchain-based web service.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

In blockchain application development, a mid-station service (e.g., a mid-layer service between a front-end service and a back-end service) that integrates the blockchain software development kits (SDK) is usually provided to call the blockchain methods. The mid-station service serves as a link between the user and the blockchain network/system. However, such mid-station service is generally black box and requires the user to trust the mid-station service, which can bring security concerns. Moreover, the mid-station service is implemented as a centralized system, which undermines the decentralized nature of the blockchain network/system. Therefore, solutions for implementing a blockchain-based web services are desirable.

SUMMARY

This specification describes technologies for implementing a blockchain-based web service. These technologies generally involve implementing a web service based on a blockchain network. In some embodiments, web services (e.g., providing static web pages, modifying web data) are provided to clients by smart contracts executing on blockchain network nodes of the blockchain network. In some embodiments, the smart contracts are executed in software containers that are deployed in the blockchain network nodes.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
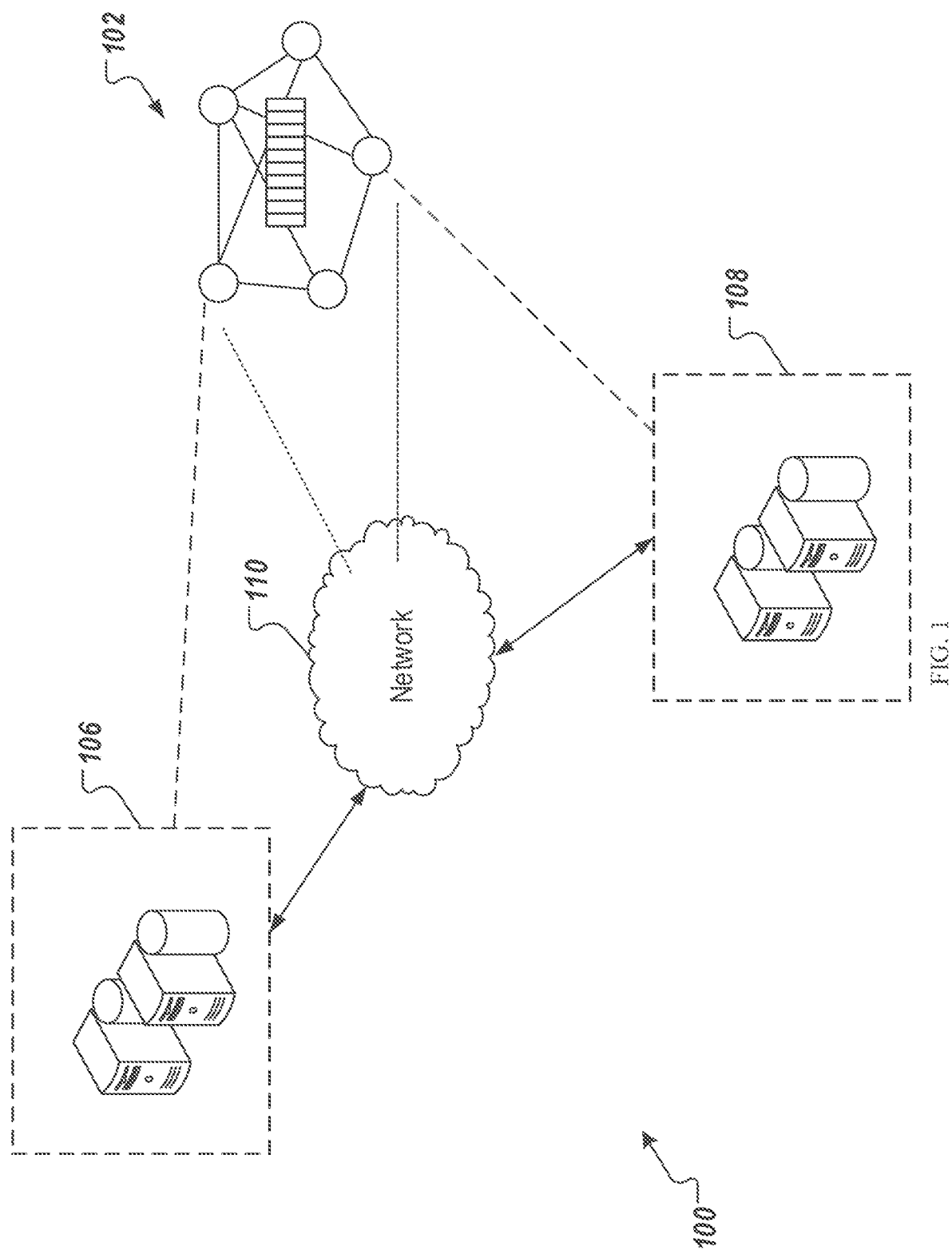
FIG. 1 is a diagram illustrating an example of an environment that can be used to execute embodiments of this specification.

This specification describes technologies for implementing a blockchain-based web service. These technologies generally involve implementing a web service based on a blockchain network. In some embodiments, web services (e.g., providing static web pages, modifying web data) are provided to clients by smart contracts executing on blockchain network nodes of the blockchain network. In some embodiments, the smart contracts are executed in software containers that are deployed in the blockchain network nodes.

The techniques described in this specification produce several technical effects. In some embodiments, the described techniques enhance data security. For example, when requesting web services, clients can directly access the blockchain network nodes of the blockchain network using the browser without using an intermediate agent such as a mid-station service. This helps avoid compromising data security caused by using an intermediate agent. In some embodiments, the described techniques provide improved flexibility and scalability of the system. In some embodiments, the web services are provided by the blockchain network nodes of the blockchain network to the client devices without an intermediate agent, and clients can have defined interfaces with the blockchain network nodes for obtaining web services from each blockchain network node of the blockchain network. In some embodiments, each blockchain network node can include one or more software containers to execute web-service-based requests and logics independently, without relying on external servers to execute the web service requests and logics. In some embodiments, the web data that are stored on the blockchain network nodes of the blockchain network can be accessed without using a software development kit (SDK) of the blockchain network. This reduces complexity of the system that implements the blockchain-based web services, thus improves the efficiency of the system.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing devices 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing devices 106, 108 host one or more computer-implemented services for interacting with the consortium blockchain network 102. For example, the computing device 106 can host computer-implemented services of a first entity (e.g., user A), such as a transaction management system that the first entity uses to manage its transactions with one or more other entities (e.g., other users). The computing device 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing devices 106, 108 provide nodes of the first entity, and second entity respectively, which participate in the consortium blockchain network 102.

Figure 2:
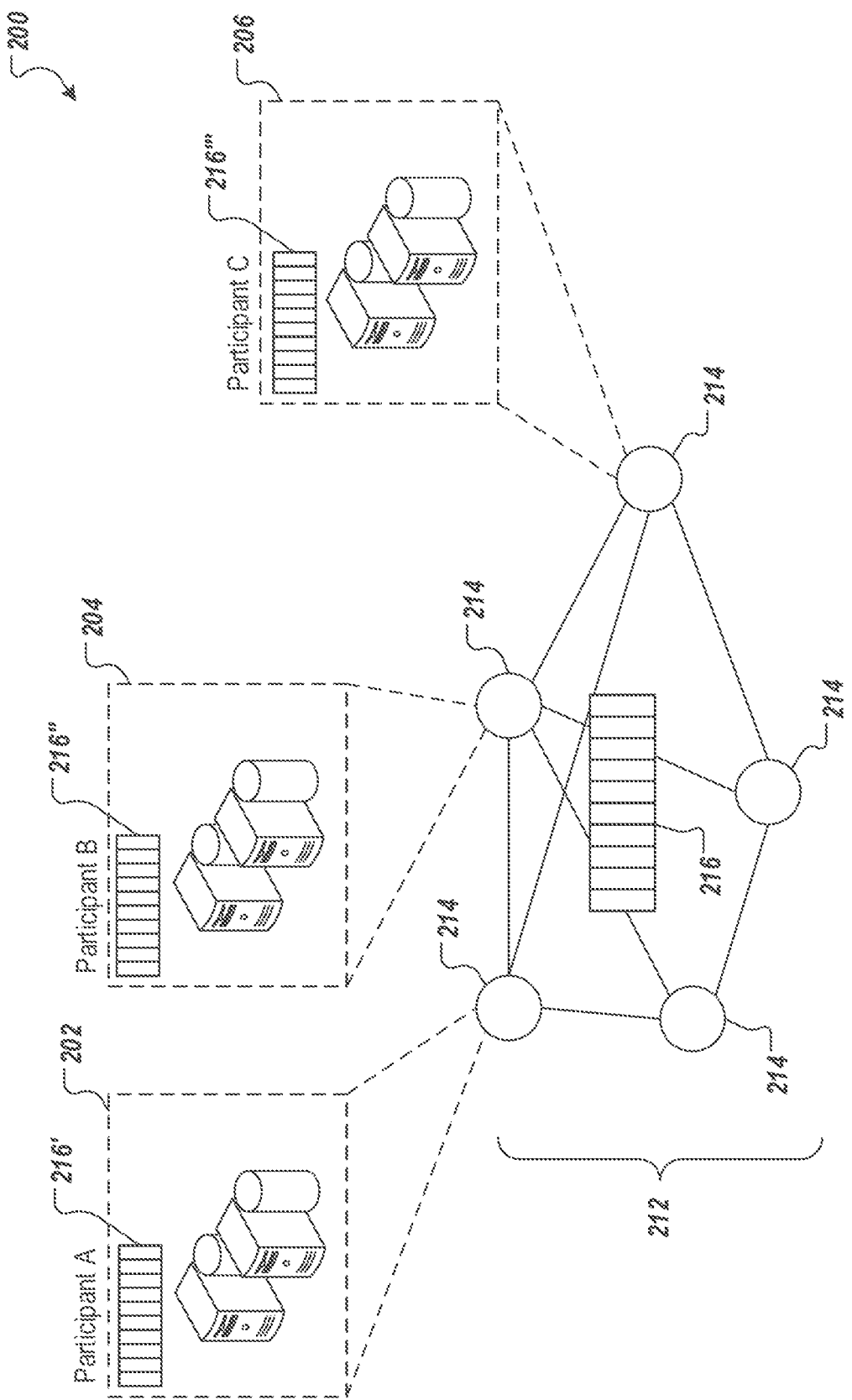
FIG. 2 is a diagram illustrating an example of an architecture in accordance with embodiments of this specification.

FIG. 2 is a diagram illustrating an example of an architecture 200 in accordance with embodiments of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, 206 store respective, complete copies 216', 216", and 216'" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
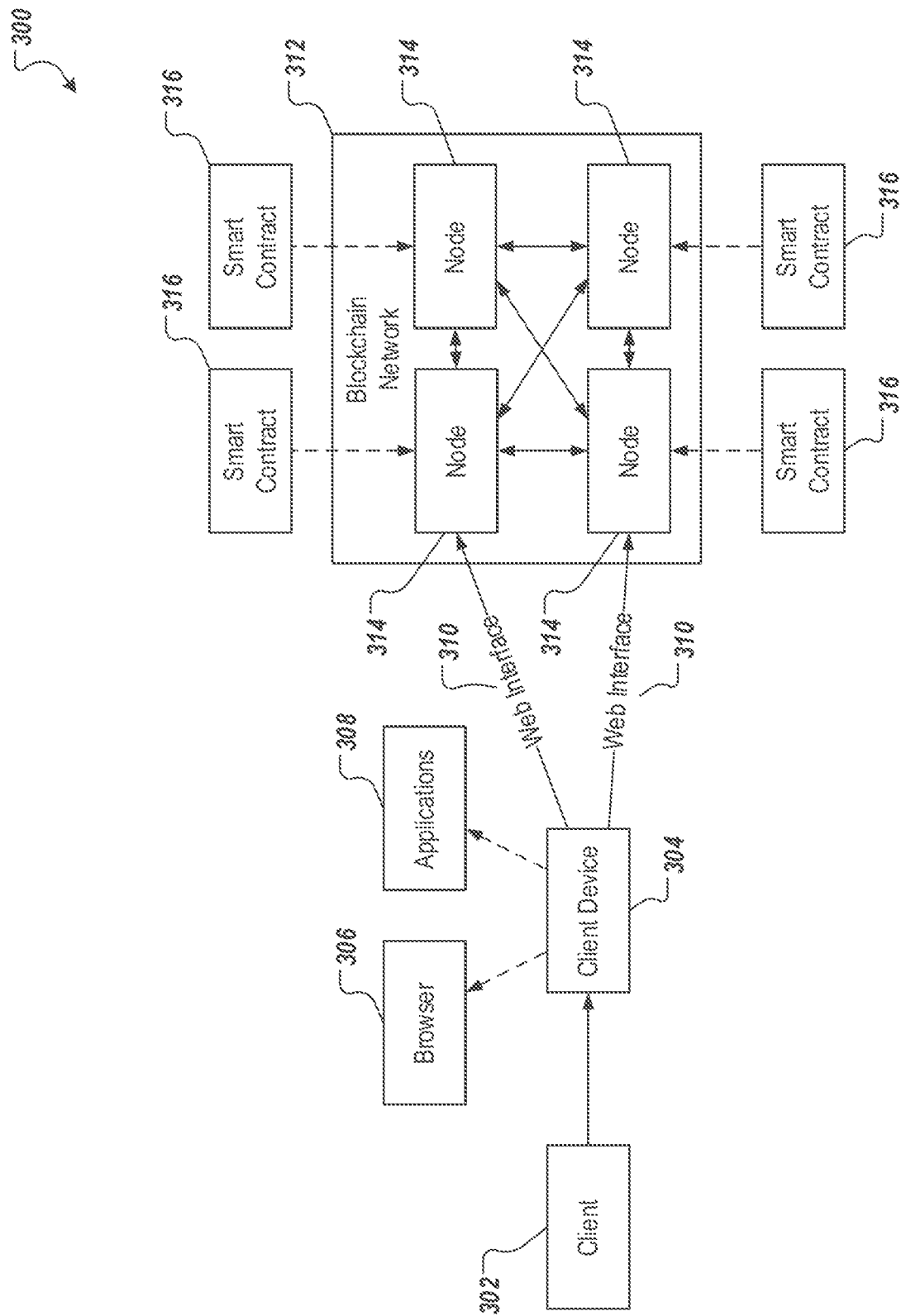
FIG. 3 is a diagram illustrating an example of a system for implementing a web service in accordance with embodiments of this specification.

FIG. 3 is a diagram illustrating an example of a system 300 in accordance with embodiments of this specification. The system 300 implements a web service based on a blockchain network. In general, a web service is a system and method of communication among electronic devices over a network. In some embodiments, a web service includes a system designed to support interoperable machine-to-machine interaction over a network (e.g., the Internet or private networks). In some embodiments, a web service facilitates communication among web applications or systems by using open standards such as HyperText Transfer Protocol (HTTP), Java, Hypertext Markup Language (HTML), Extensible Markup Language (XML), Web Services Description Language (WSDL), and Simple Object Access Protocol (SOAP), etc. Software applications written in various programming languages (e.g., Java and Python) and running on various platforms (e.g., Windows and Linux systems) can use the web service to exchange data over computer networks. This interoperability (e.g., between Java and Python, or Windows and Linux applications) is due to the use of the open standards in the web service. In some embodiments, a web service provides a web interface (e.g., a web application programming interface (API)) for communication among components of the system that implements the web service. In some embodiments, the web service includes providing web data (e.g., static web pages or dynamic web data) to a client device, or modifying web data that is stored on a network (e.g., a blockchain network) in response to a client request, etc.

As an example, the system 300 includes a client 302, a client device 304, web interfaces 310, and a blockchain network 312. In general, a client 302 can use the client device 304 to send a web service request to the blockchain network 312. A blockchain network node 314 of the blockchain network 312 can process the web service request and return a request result to the client 302 via the client device 304. In some embodiments, the system 300 is configured such that the client device 304 can communicate with the blockchain network node 314 of the blockchain network 312 using a web interface 310. The web interface 310 can include any suitable interface that facilitates communications among components of system 300. In some embodiments, the web interface 310 can include web APIs such as Representational State Transfer (REST) web APIs (or RESTful APIs) base on HTTP methods (e.g., GET, POST, PUT, etc.). RESTful web APIs provide interoperability between computer systems on the Internet and allow a requesting system to access and manipulate textual representations of web resources by using a uniform and predefined set of stateless operations. In some embodiments, the web interface 310 can alternatively include SOAP-based web APIs using XML as the payload format.

The client device 304 can include, for example, any suitable computer, module, server, or computing element programmed to perform methods described herein. As shown, the client device 304 includes a web browser 306 and software applications 308 for providing various functions of the client device 304. In some embodiments, the web browser 306 can include any suitable web browser for accessing information on the Internet, for example, Google Chrome®, Mozilla Firefox®, Internet Explorer®, etc.

In some embodiments, the blockchain network 312 can be a consortium blockchain network. As shown, the blockchain network 312 includes multiple blockchain network nodes 314. Note that the blockchain network 312 is shown to include four blockchain network nodes 314 for illustrative purposes only. The blockchain network 312 can include any suitable number of blockchain network nodes 314. Each of the blockchain network nodes 314 can deploy one or more smart contracts 316 for providing web services independently, without relying on an intermediate node or server (e.g., a centralized server shared by some or all of the blockchain network nodes 314). Note that the smart contracts 316 are shown to be outside of the blocks representing the blockchain network nodes 314 for illustrative purposes only. The smart contracts 316 can be deployed and executed in the blockchain network nodes 314.

Figure 4:
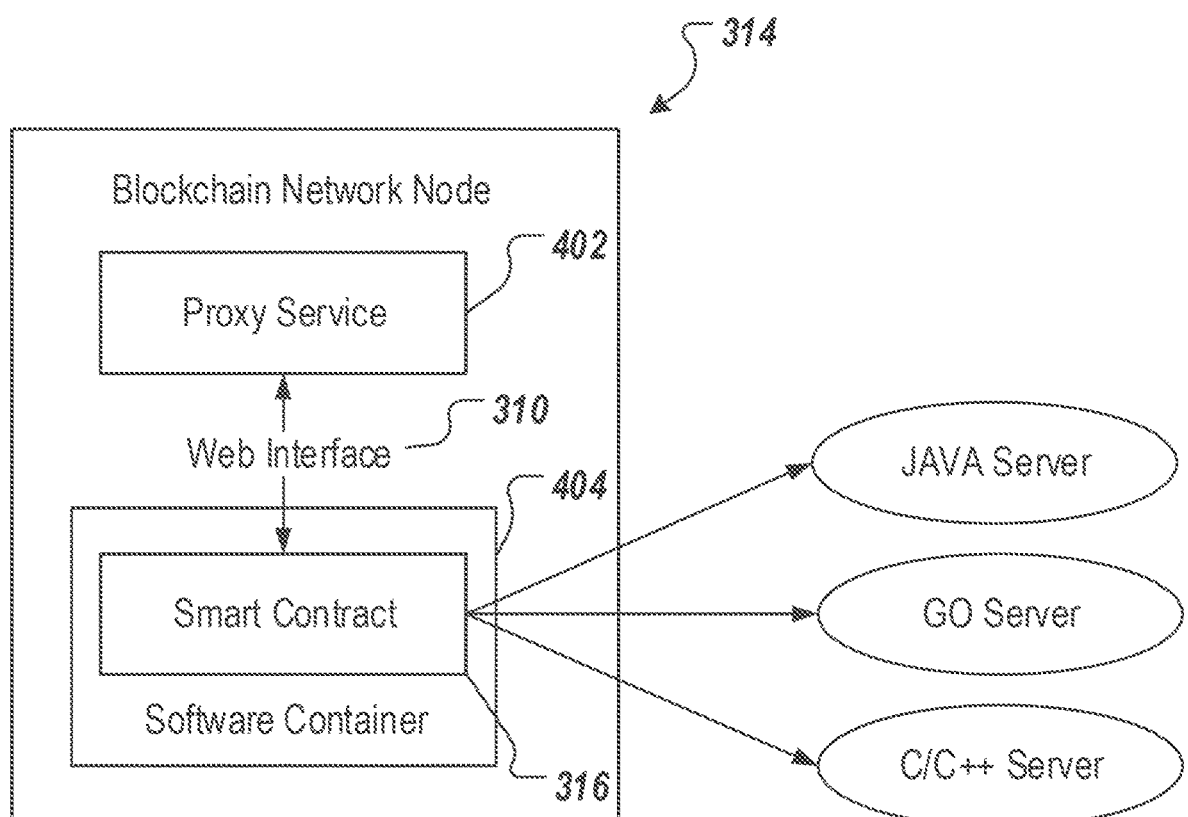
FIG. 4 is a diagram illustrating an example of a blockchain network node in accordance with embodiments of this specification.

FIG. 4 is a diagram illustrating an example of a blockchain network node (e.g., the blockchain network node 314) in accordance with embodiments of this specification. In some embodiments, blockchain network node 314 is self-contained in providing web services, for example, by using the smart contract 316 deployed in the blockchain network node 314. In some embodiments, the smart contract 316 can include defined functions or operations to retrieve, generate, store, or otherwise manipulate or manage web service data. The blockchain network node 314 can include a proxy service 402 and a software container 404. In some embodiments, the proxy service 402 can be a subsystem or application in the blockchain network node 314 that acts as an intermediary for processing requests from client devices 304 seeking web resources from the blockchain network 312 or other servers. The software container 404 can be used for executing the smart contract 316. As shown, the proxy service 402 is communicatively connected to the smart contract 316 via a web interface 310.

In some embodiments, the proxy service 402 is configured to be compatible with the web interface 310, such that, the blockchain network node 314 can communicate with the client device 304 (e.g., the web browser of the client device 304) over the web interface 310 (e.g., an RESTful API). For example, the proxy service 402 can be configured as an RESTful API proxy to include functions such as receiving, reading, and forwarding instructions formatted according to RESTful APIs. In some embodiments, the proxy service 402 can forward web service requests formatted according to RESTful APIs to the smart contract 316. As such, no intermediate web server is needed for translating or bridging web services between the client node 304 and the blockchain network node 314. In some embodiments, such configurations allow the web service requests from the client device 304 and communications between the blockchain network node 314 and the smart contracts over a web interface such as in RESTful API formats.

In some embodiments, the proxy service 402 can provide administrative control over the content that is relayed in one or both directions through the proxy service 402. For example, the proxy service 402 can filter the content that is relayed through the proxy service 402 to ensure that web usage conforms to an acceptable use policy. In some embodiments, the proxy service 402 provides client authentication to control web access. For example, the proxy service 402 can determine whether a client 302 is authorized to access web data stored on the blockchain network 312 using an authentication procedure.

In some embodiments, the software container 404 can deploy and execute the smart contract 316. In some embodiments, the smart contract 316 can be configured to include functions such as receiving, reading, and processing instructions formatted according to RESTful APIs. For example, the smart contract 316 can receive and process web service requests forwarded by the proxy service 402, which are formatted according to RESTful APIs.

In some embodiments, the smart contract 316 can receive and process instructions written in programming language typically used for web services, such as Java, Go, or C/C++, etc. In some embodiments, unlike a typical smart contract that is executed by a virtual machine in a blockchain network, the smart contract 316 is designed for providing web service independent of another intermediate or external node or server. As such, the smart contract 316 deployed in the blockchain network node 314 can be associated with appropriate servers for executing the web service request written in programming language used for web services. In some embodiments, the software container 404 include one or more web servers that use network protocols (e.g., HTTP, etc.) to serve web data (e.g., static HTML web pages, etc.) to clients in response to client requests. For example, the web server can include one or more of a Java server, a Go server, a C/C++ server, or any other appropriate server. In some embodiments, the smart contract 316 be executed or otherwise accessed by the web server by each of the blockchain network node 314 independently.

In some embodiments, the software container 404 includes a standalone, executable package of software for executing the smart contract 316 in the software container 404. In general, the software container 404 is a unit of software that packages up code and all its dependencies so the containerized application (e.g., the smart contract 316) in the software container 404 runs quickly and reliably from one computing environment to another. In some embodiments, the software container 404 includes any code, runtime, system tools, system libraries, and/or settings that are needed to run an application such as the smart contract 316. The software container 404 can support various platforms, such as Linux and Windows-based applications. In some embodiments, the software container 404 isolates the containerized applications from its environment and ensures that it works uniformly despite differences, for instance, between development and staging. The containerized applications in the software container 404 can run the same, regardless of the infrastructure. In some embodiments, the software container 404 can be any suitable software container, such as a DOCKER® container, etc.

Software containers have many features. In some embodiments, the software containers can be standard such that they can be portable anywhere. In some embodiments, the software containers can share the underlying device's operating system (OS) kernel and therefore do not request an OS per application, driving higher sever efficiencies and reducing server costs. In some embodiments, applications are safer or more secure in software containers due to the isolation capabilities of the software containers. Note that the software containers as described herein are different from virtual machines, although that have similar resource isolation and allocation benefits. The software containers function differently from virtual machines in that the software containers virtualize the operating system instead of hardware, thereby providing more portability and efficiency over virtual machines.

In some embodiments, each blockchain network node 314 can include a smart contract 316 for providing a web service. In some embodiments, a client 302 can obtain a same web service from each blockchain network node 314 of the blockchain network 312, for example, because each blockchain network node 314 of the blockchain network 312 can deploy the same smart contract 316 and store a copy of the web data for providing the web service after reaching consensus among the blockchain network nodes 314 of the blockchain network 312. In some embodiments, the blockchain network node 314 can include multiple smart contracts 316. Each smart contract 316 can be individually deployed in a software container 404. For example, the blockchain network node 314 can include a first smart contract 316 and a second smart contract 316. The first smart contract 316 can be deployed in a first software container 404, while the second smart contract 316 can be deployed in a second software container 404. Each smart contract 316 can individually provide a web service that is the same or different from another smart contract 316. For example, a first smart contract 316 can include a Java server that is deployed in a first software container 404, while a second smart contract 316 can include a Go server that is deployed in a second software container 404.

Figure 5:
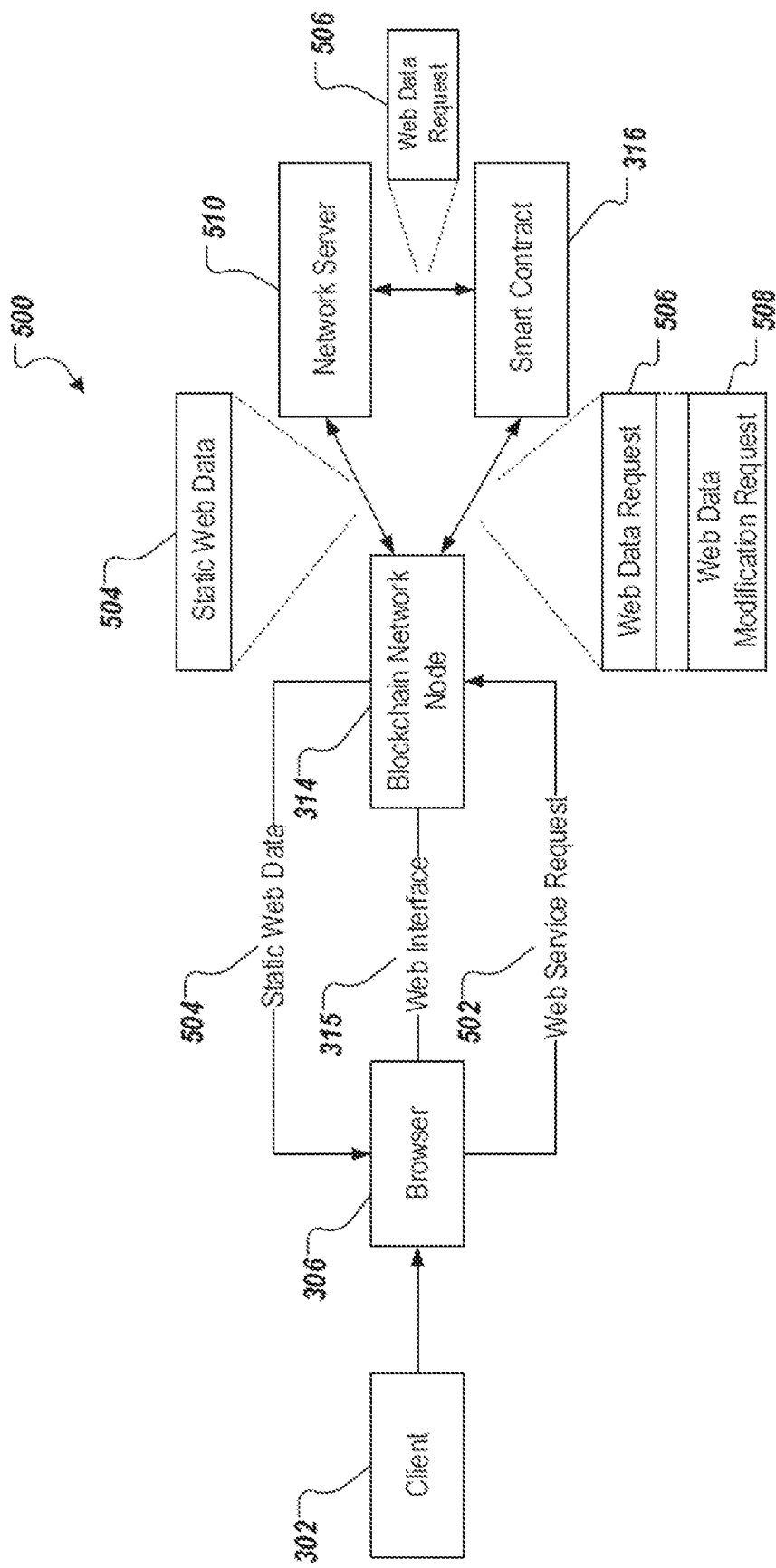
FIG. 5 is a diagram illustrating an example of a system for implementing a web service in accordance with embodiments of this specification.

FIG. 5 is a diagram illustrating an example of a system 500 in accordance with embodiments of this specification. The system 500 implements a web service based on a blockchain network. As shown, the system 500 includes a client 302, a web browser 306, a blockchain network node 314 in a blockchain network, a smart contract 316 executing on the blockchain network node 314, and a network server 510. In some embodiments, the network server 510 can be configured to store web data (e.g., web pages, etc.). In some embodiments, the network server 510 can include a distributed file system. In some embodiments, the network server 510 can be located external to the blockchain network or integrated within the blockchain network. For example, the network server 510 can include an InterPlanetary File System (IPFS) which is a protocol and network designed to create a content-addressable, peer-to-peer method of storing and sharing hypermedia in a distributed file system.

In some embodiments, the client 302 can be a user operating a client device on which a web browser 306 is installed. The client 302 can request a web service from the blockchain network node 314 using the web browser 306. For example, a web service request 502 is sent by the web browser 306 to the blockchain network node 314 using a web interface 315, such as an HTTP-based API (e.g., RESTful API). In some embodiments, the web service request 502 can be a request for web data (e.g., a static web page or dynamic web data) that is stored on the blockchain network node 314. The web service request 502 can be, for example, a request to retrieve web data or a request to modify web data that is stored on the blockchain network node 314. In some embodiments, the web service request 502 can include a web data request 506, or a web data modification request 508. For example, the client 302 can enter a network address (e.g., a Uniform Resource Locator or URL) in a graphical user interface (GUI) of the web browser 306 to request web data 504, such as one or more static web pages from the blockchain network node 314. As another example, the client 302 can send a web data modification request 508 to the blockchain network node 314 to modify web data that is stored on the blockchain network node 314.

In some embodiments, the blockchain network node 314 forwards the web service request 502 (e.g., the web data request 506 or the web data modification request 508) to the smart contract 316 that is deployed on the blockchain network node 314. In some embodiments, the blockchain network node 314 determines whether the client 302 is authorized to access the web data prior to forwarding the web service request 502 to the smart contract 316. As noted, in some embodiments, the blockchain network node 314 can include a proxy service 402 as shown in FIG. 4. The proxy service 402 can be configured to determine whether the client 302 is authorized to access the web data. For example, the proxy service 402 can verify a digital signature included in the web service request 502 that is associated with the client 302. If it is determined that the digital signature is valid, the proxy service 402 can determine that the client 302 is authorized to access the web data and thus accept the web service request 502 from the client 302. If it is determined that the digital signature is not valid, the proxy service 402 can determine that the client 302 is not authorized to access the web data and thus reject the web service request 502 from the client 302.

After it is determined that the client 302 is authorized to access the web data, the blockchain network node 314 can forward the web service request 502 to the smart contract 316. In some embodiments, the smart contract 316 can be associated within a web server (e.g., a Java server, a Go server, or a C/C++ server) that uses a network protocol (e.g., HTTP, etc.) to serve web data (e.g., HTTP web pages, etc.) in response to the web service request 502. If the web service request 502 is a web data request 506 for static web data 504 (e.g., static web pages), the smart contract 316 can self-execute and generate an execution result (e.g., by retrieving the web data stored in the blockchain network node 314) including the static web data 504. The blockchain network node 314 can return the static web data 504 to the web browser 306. In some embodiments, the smart contract 316 can retrieve the static web data 504 from a distributed file system that is located external to the blockchain network that includes the blockchain network node 314. For example, as shown in FIG. 5, the smart contract 316 can query the network server 510, which can be an IPFS system, for the requested static web data 504. In response to the query from the smart contract 316, the network server 510 can return the requested static web data 504 to the blockchain network node 314. The blockchain network node 314 can subsequently return the static web data 504 to the web browser 306 in response to the web service request 502.

In some embodiments, if the web service request 502 is a web data modification request 508 for modifying web data that is stored on the blockchain network, the blockchain network node 314 can broadcast the web data modification request 508 to the other blockchain network nodes of the blockchain network. In some embodiments, the blockchain network node 314 can broadcast the web data modification request 508 to all the consensus nodes of the blockchain network. The consensus nodes of the blockchain network can perform a consensus procedure on the web data modification request 508. If a consensus is reached among the consensus nodes, for example, if a majority number of the consensus nodes agree to modify the web data, the smart contract 316 can modify the web data stored in the blockchain network node 314. If a consensus is not reached among the consensus nodes, the smart contract 316 can send an error or warning message to the client 302 indicating a failure to modify the web data. In some embodiments, modifying the web data can include updating data that is stored on the blockchain network node 314. In some embodiments, modifying the web data does not violate the immutable nature of the blockchain network. For example, modifying the web data does not delete or modify the data itself that has been stored on the blockchain network node 314, but rather by adding or appending log files or instructions to, delete, add, or otherwise update the data that has been stored on the blockchain network node 314.

Figure 6:
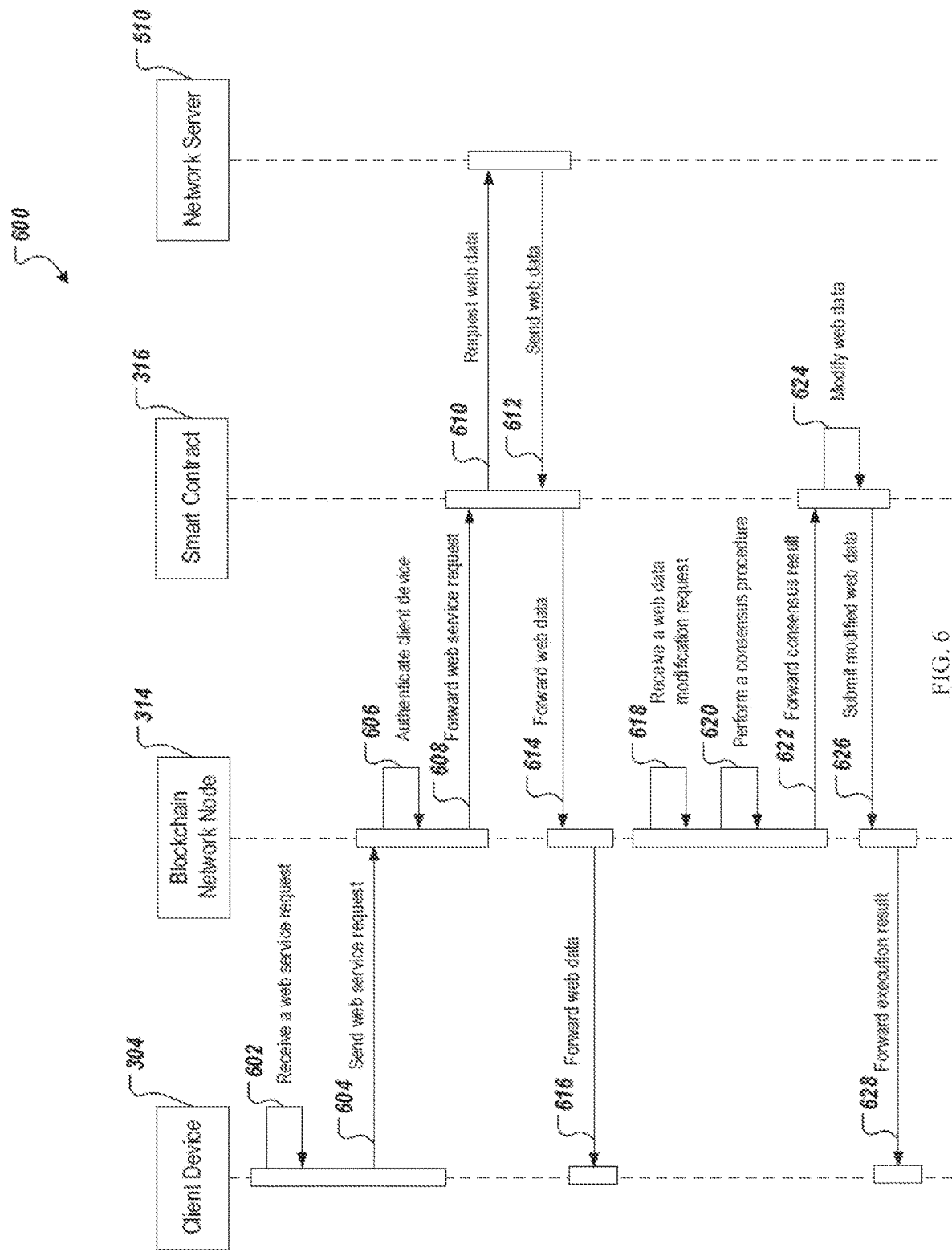
FIG. 6 is a signal flow illustrating an example of a process that can be executed in accordance with embodiments of this specification.

FIG. 6 is a signal flow illustrating an example of a process 600 that can be executed in accordance with embodiments of this specification. The signal flow represents a process 600 for implementing a blockchain-based web service. For convenience, the process will be described as being performed by a system of one or more computers, located in one or more locations, and programmed appropriately in accordance with this specification. For example, a distributed system (e.g., the system 300 of FIG. 3), appropriately programmed, can perform the process.

At 602, a client device 304 receives a web service request, for example, from a client 302 (e.g., a user of the client device). In some embodiments, the web service request can be a request for web data (e.g., a request to retrieve web data or a request to modify web data) that is stored on the blockchain network node 314. For example, the web service request can include a web data request, or a web data modification request. In some embodiments, the client device 304 receives the web service request from a client operating the client device 304. For example, a client can enter a network address (e.g., a URL) in a GUI of a web browser installed on the client device 304 to submit a HTTP request for web data, such as a few static web pages from the blockchain network node 314. As another example, the client submits a web data modification request to the client device 304 using the web browser (e.g., entering information into a static web page).

At 604, the client device 304 forwards the web service request to the blockchain network node 314. In some embodiments, the client device 304 can forward the web service request to any blockchain network node 314 of the blockchain network. In some embodiments, the client device 304 forwards the web service request to the blockchain network node 314 using a web interface, such as a HTTP-based API (e.g., RESTful API).

At 606, the blockchain network node 314 authenticates the client device 304 after receiving the web service request. In some embodiments, the blockchain network node 314 determines whether the client device 304 is authorized to access the web data. In some embodiments, the blockchain network node 314 can include a proxy service configured to determine whether the client device is authorized to access the web data. For example, the proxy service can verify a digital signature included in the web service request that is associated with the client device 304. If it is determined that the digital signature is valid, the proxy service can determine that the client device 304 is authorized to access the web data and thus accept the web service request from the client device 304. If it is determined that the digital signature is not valid, the proxy service can determine that the client device 304 is not authorized to access the web data and thus reject the web service request.

At 608, after it is determined that the client device 304 is authorized to access the web data, the blockchain network node 314 forwards the web service request (e.g., a web data request or a web data modification request) to a smart contract 316 executing on the blockchain network node 314. In some embodiments, the smart contract 316 is deployed in a software container in the blockchain network node 314. The software container can be a unit of software that packages up code and all its dependencies so the containerized application (e.g., smart contract 316) in the software container runs quickly and reliably from one computing environment to another. In some embodiments, the smart contract 316 can be associated with a web server (e.g., a Java server, a Go server, or a C/C++ server) that uses a network protocol (e.g., HTTP, etc.) to serve web data (e.g., HTTP web pages, etc.) to the client in response to the web service request.

At 610, the smart contract 316 can request web data from a network server 510 if the web service request is a web data request for static web data (e.g., static web pages) and the smart contract 316 determines that the requested data is stored on the network server 510. In some embodiments, the smart contract 316 can self-execute and generate a web data query to be submitted the network server 510. In some embodiments, the network server 510 can be a distributed file system (IPFS system) that is located external to the blockchain network hosting the blockchain network node 314. In some embodiments, the smart contract 316 can forward the web service request to the network server 510.

In some embodiments, the blockchain network node 314 can record the information of the web service request in the blockchain network node 314. For example, the web service request can be included in a transaction that is submitted to the blockchain network node 314. The blockchain network node 314 can process the transaction and record the transaction in a blockchain block that is stored in the blockchain network node 314. In this way, information of the web service request, such as the requestor of the web service request, data that is requested (e.g., a URL), a timestamp indicating a time when the web service request is submitted, can be recorded in the blockchain network node 314 and the overall blockchain network. In some embodiments, the blockchain network node 314 can further record information related to the smart contracts (e.g., smart contract 316) that are invoked to process the web service request in the blockchain network node 314. For example, the blockchain network node 314 can store identifiers and/or version numbers of the smart contracts, data that the smart contacts called to produce an execution result, etc. Unlike existing technologies that do not store the information related to the web service request, the method as described herein includes storing these data in the blockchain network node 314, which leverages the immutability of the blockchain network and thus improves the data traceability of the web service provided by the system.

At 612, the network server 510 sends the requested web data to the smart contact 316. In some embodiments, the network server 510 can retrieve the requested web data (e.g., static web pages) based on a URL included in the web data query or web service request from the smart contract 316.

In some embodiments, if the requested web data is stored on the blockchain network node 314, the smart contract 316 can retrieve the web data from the blockchain network node 314 and prepare an execution result including the web data.

At 614, after obtaining the requested web data, the smart contract 316 forwards the web data to the blockchain network node 314. In some embodiments, the smart contract 316 prepares an execution result including the web data and sends the execution result to the blockchain network node 314.

At 616, the blockchain network node 314 forwards the web data to the client device 304, for example, using a web interface. In some embodiments, the proxy service of the blockchain network node 314 can determine whether the web data includes data that the client device 304 is not authorized to access. If it is determined that the web data includes data that the client device 304 is not authorized to access, the blockchain network node 314 can send an error or warning message to the client device 304 indicating that the web service request cannot be fulfilled. If it is determined that the web data includes data that the client device 304 is authorized to access, the proxy service can forward the requested web data to the client device 304. For example, the proxy service can forward the requested web data to the web browser of the client device 304.

In some embodiments, the client device 304 can send a web data modification request to the blockchain network node 314. For example, the client device 304 can send a request to the blockchain network node 314 to modify a blockchain data element that is stored in the blockchain network node 314. At 618, the blockchain network node 314 receives the web data modification request from the client device 304.

At 620, the blockchain network node 314 performs a consensus procedure for the web data modification request. In some embodiments, the blockchain network node 314 can broadcast the web data modification request to other blockchain network nodes of the blockchain network. In some embodiments, the blockchain network node 314 can broadcast the web data modification request to all the consensus nodes of the blockchain network. The consensus nodes of the blockchain network can perform a consensus procedure for the web data modification request. The blockchain network node 314 can determine whether a consensus has been reached among the consensus nodes based on a consensus result of the consensus procedure. In some embodiments, a consensus is reached if a majority number of the consensus nodes agree to modify the web data.

At 622, the blockchain network node 314 forwards the consensus result to the smart contract. For example, if a consensus is reached among the consensus nodes, the blockchain network node 314 can send a consensus result to the smart contract indicating a consensus has been reached. If a consensus is not reached among the consensus nodes, the blockchain network node 314 can send a consensus result to the smart contract indicating that a consensus has not been reached.

At 624, the smart contract 316 can be executed to modify the web data stored in the blockchain network node 314 if it is determined that a consensus has been reached among the consensus nodes of the blockchain network. If it is determined that a consensus is not reached among the consensus nodes, the smart contract 316 can refrain from modifying the web data stored in the blockchain network node 314.

At 626, the smart contract 316 generate an execution result of the web data request and sent the execution result to the blockchain network node 314. In some embodiments, the execution result can indicate whether the web data request has been successfully executed. For example, the execution result can indicate whether the web data has been successfully modified. In some embodiments, the execution result can include the modified web data.

At 628, after obtaining the execution result of the web data request, the blockchain network node 314 can forward or otherwise notify the client device 304 the execution result of the web data request, for example, using a web interface. In some embodiments, the blockchain network node 314 forwards the modified web data to the client device 304.

Figure 7:
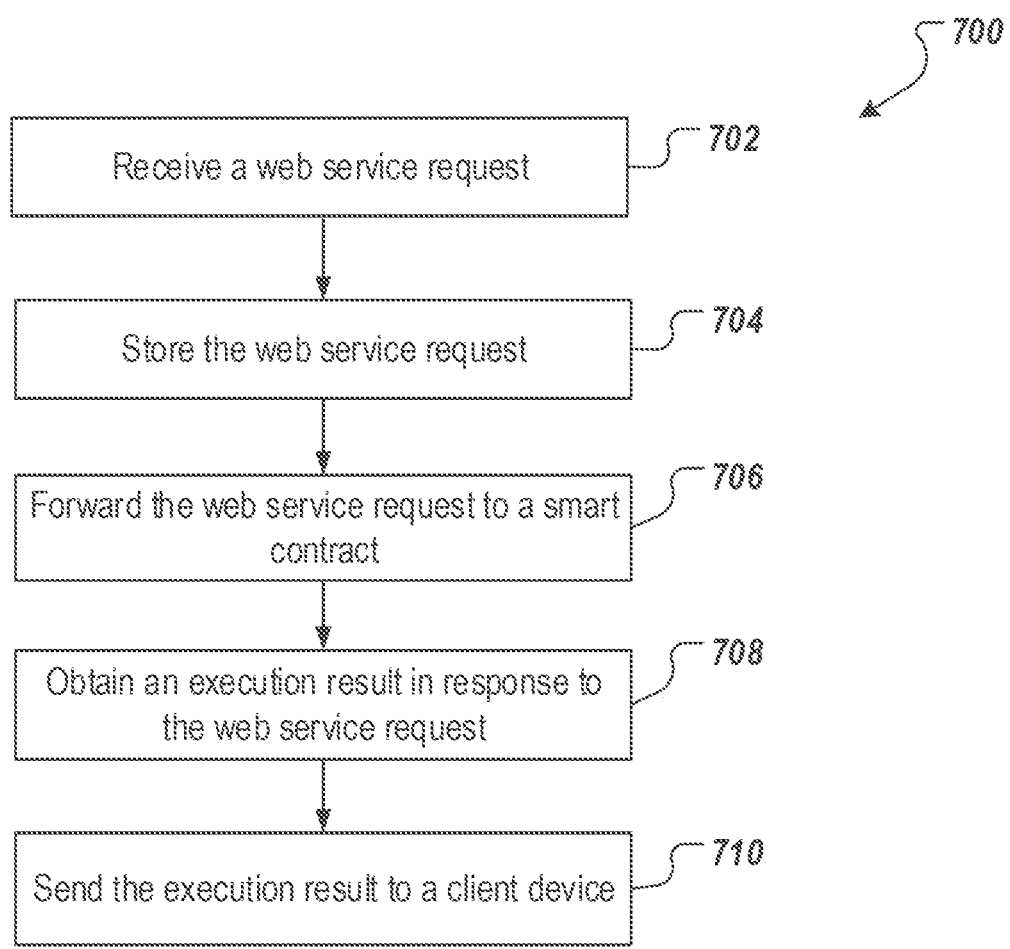
FIG. 7 is a flowchart illustrating a process that can be executed in accordance with embodiments of this specification.

FIG. 7 is a flowchart illustrating an example of a process 700 for implementation of a workflow that can be executed in accordance with embodiments of this specification. The process 700 can be a process performed by a blockchain network in the context of the process 600 of FIG. 6. For convenience, the process 700 will be described as being performed by a system of one or more computers, located in one or more locations, and programmed appropriately in accordance with this specification. For example, a distributed system, e.g., the blockchain system 300 of FIG. 3, appropriately programmed, can perform the process 700.

At 702, a blockchain network node (e.g., blockchain node 314) of a blockchain network receives a web service request for web data from a client device. In some embodiments, the web service request is sent by the client device to the blockchain network node using a web interface. In some embodiments, the web service request includes a HTTP request. In some embodiments, the HTTP request includes an HTTP address for the web data. In some embodiments, the web interface includes HTTP-based API. In some embodiments, the web service includes a web service written in Java, Go, or C/C++ computer programming language, and the software container includes at least one of a JAVA server, a GO server, or a C/C++ server, respectively.

At 704, the blockchain network node stores the web service request in the blockchain network node. In some embodiments, the blockchain network node can process a transaction that includes the web service request and record the transaction in a blockchain block that is stored in the blockchain network node. In some embodiments, information of the web service request, such as the requestor of the web service request, data that is requested (e.g., a URL), a timestamp indicating a time when the web service request is submitted, can be recorded in the blockchain network node and the overall blockchain network. In some embodiments, the blockchain network node can further record information related to the smart contracts (e.g., smart contract) that are invoked to process the web service request in the blockchain network node. For example, the blockchain network node can store identifiers and/or version numbers of the smart contracts, data that the smart contacts called to produce an execution result, etc.

At 706, the blockchain network node forwards the web service request to a smart contract deployed in a software container on the blockchain network node for providing a web service. In some embodiments, the software container includes a standalone, executable package of software for executing the smart contract in the software container on the blockchain network node. In some embodiments, the blockchain network node includes a second smart contract deployed in a second software container on the blockchain network node for providing a second web service. In some embodiments, the second software container includes a second standalone, executable package of software for executing the second smart contract in the second software container on the blockchain network node.

In some embodiments, the blockchain network node determines whether the client device is authorized to access the web data prior to forwarding the web service request to the smart contract. If it is determined that the client device is authorized to access the web data, the blockchain network node forwards the web service request to the smart contract. In some embodiments, the blockchain network node provides a proxy service for forwarding the web service request to the smart contract. In some embodiments, the blockchain network node forwards the web service request to the smart contract using the web interface.

At 708, the blockchain network node obtains an execution result in response to the web service request from the smart contract. In some embodiments, the web service request includes a request for static web data that is stored on the blockchain network node. In some embodiments, in response to the request for static web data, the blockchain network node obtains an execution result including the static web data. In some embodiments, the web service request includes a request for static web data that is stored in a distributed network server external to the blockchain network. In some embodiments, in response to the request for static web data, the blockchain network node obtains an execution result including the static web data retrieved by the smart contract from the distributed network server.

In some embodiments, the web service request includes a request for modifying web data stored in the blockchain network node. In some embodiments, the blockchain network node broadcasts the request for modifying web data to a plurality of consensus nodes of the blockchain network. In some embodiments, in response to a consensus procedure performed by the plurality of the consensus nodes, the smart contract modifies the web data stored in the blockchain network node. In some embodiments, the smart contract generates an execution result indicating the modifying the web data stored in the blockchain network node.

At 710, the blockchain network node sends the execution result to the client device using the web interface. In some embodiments, the execution result includes static web data (e.g., static web pages). In some embodiments, the blockchain network node can send the execution result to a web browser of the client device using a HTTP-based API.

Figure 8:
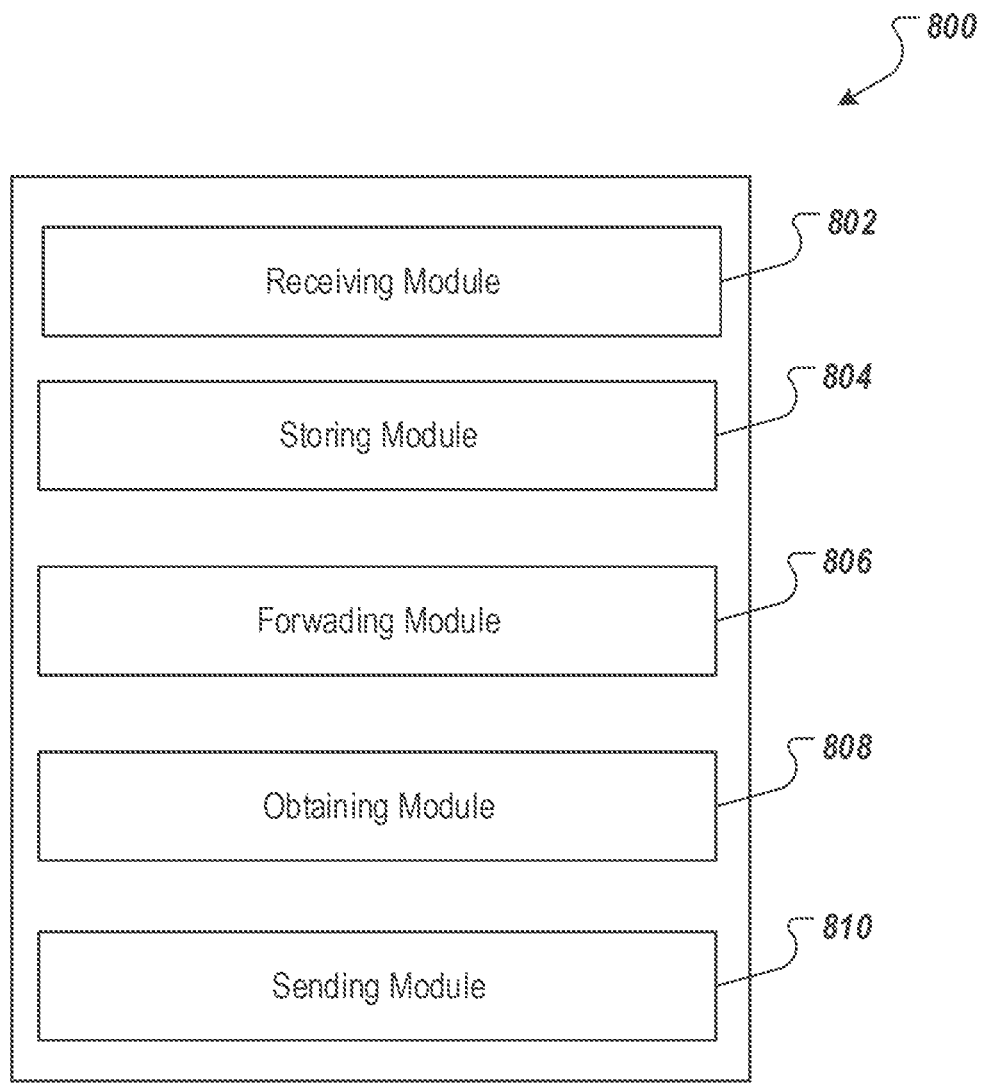
FIG. 8 depicts examples of modules of an apparatus in accordance with embodiments of this specification.

FIG. 8 depicts examples of modules of an apparatus 800 in accordance with embodiments of this specification. The apparatus 800 can be an example of an embodiment of a node of a blockchain network configured to implement a blockchain-based web service. The apparatus 800 can correspond to the embodiments described above, and the apparatus 800 includes the following: a receiving module 802 that receives a web service request for web data from a client device, wherein the web service request is sent by the client device to the blockchain network node using a web interface; a storing module 804 that stores the web service request in the blockchain network node; a forwarding module 806 that forwards the web service request to a smart contract deployed in a software container on the blockchain network node for providing a web service, wherein the software container comprises a standalone, executable package of software for executing the smart contract in the software container on the blockchain network node; an obtaining module 808 that obtains an execution result in response to the web service request; and a sending module 810 that sends the execution result to the client device using the web interface.

In an optional embodiment, the web service request comprises a HyperText Transfer Protocol (HTTP) request, wherein the HTTP request comprises an HTTP address for the web data.

In an optional embodiment, the web interface comprises HTTP-based application programming interface (API).

In an optional embodiment, the web service comprises a web service written in Java, Go, or C/C++ computer programming language, and the software container comprises at least one of a JAVA server, a GO server, or a C/C++ server, respectively.

In an optional embodiment, the software container comprises a DOCKER container.

In an optional embodiment, the apparatus 800 further includes a determining sub-module that determines whether the client device is authorized to access the web data. The forwarding, by the blockchain network node, of the web service request to a smart contract comprises forwarding the web service request to the smart contract in response to determining that the client device is authorized to access the web data.

In an optional embodiment, the apparatus 800 further includes a storing sub-module that stores information related to the smart contract in the blockchain network node, the information related to the smart contract including at least one of an identifier of the smart contract, a version number of the smart contract, or data that is called by the smart contract to generate the execution result.

In an optional embodiment, the web service request comprises a request for static web data, and the static web data is stored in the blockchain network node, and the execution result in response to the web service request comprises the static web data retrieved by the smart contract.

In an optional embodiment, the web service request comprises a request for static web data, and the static web data is stored in a distributed network server external to the blockchain network. The execution result in response to the web service request comprises the static web data retrieved by the smart contract from the distributed network server.

In an optional embodiment, the web service request comprises a request for modifying web data stored in the blockchain network node. The apparatus 800 further includes the following: a broadcasting sub-module that broadcasts the request for modifying web data to a plurality of consensus nodes of the blockchain network; a modifying sub-module that modifies the web data stored in the blockchain network node in response to a consensus procedure performed by the plurality of the consensus nodes; and a generating sub-module that generates the execution result indicating the modifying of the web data stored in the blockchain network node.

In an optional embodiment, the blockchain network node comprises a second smart contract deployed in a second software container on the blockchain network node for providing a second web service, wherein the second software container comprises a second standalone, executable package of software for executing the second smart contract in the second software container on the blockchain network node.

The system, apparatus, module, or unit illustrated in the previous embodiments can be implemented by using a computer chip or an entity, or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 8, it can be interpreted as illustrating an internal functional module and a structure of a blockchain-based web service implementation apparatus. The blockchain-based web service implementation apparatus can be an example of a blockchain network node configured to implement a blockchain-based web service. An execution body in essence can be an electronic device, and the electronic device includes the following: one or more processors; and a memory configured to store an executable instruction of the one or more processors.

The techniques described in this specification produce several technical effects. In some embodiments, when requesting web services, clients can directly access the blockchain network nodes of the blockchain network using the browser without using an intermediate agent such as a mid-station service. This helps avoid compromising data security caused by using an intermediate agent. In some embodiments, the web services are provided by the blockchain network nodes of the blockchain network, and clients can obtain the same web services from each blockchain network node of the blockchain network. This increases the scalability of the system. In some embodiments, the web data that are stored on the blockchain network nodes of the blockchain network can be accessed without using a software development kit (SDK) of the blockchain network. This reduces complexity of the system that implements the blockchain-based web services, thus improves the efficiency of the system.

Described embodiments of the subject matter can include one or more features, alone or in combination. For example, in a first embodiment, a method for implementing a blockchain-based web service includes: receiving, at a blockchain network node of a blockchain network and from a client device, a web service request for web data, wherein the web service request is sent by the client device to the blockchain network node using a web interface; storing, by the blockchain network node, the web service request in the blockchain network node; forwarding, by the blockchain network node, the web service request to a smart contract deployed in a software container on the blockchain network node for providing a web service, wherein the software container comprises a standalone, executable package of software for executing the smart contract in the software container on the blockchain network node; obtaining, by the blockchain network node and from the smart contract, an execution result in response to the web service request; and sending, by the blockchain network node, the execution result to the client device using the web interface.

In other embodiments, one or more of an apparatus, a non-transitory computer-readable storage medium, and a system are provided for implementing the methods provided herein. For example, an apparatus can be a network node of a blockchain network for implementing the methods provided herein. As another example, a system can include one or more client devices, and one or more blockchain network for implementing the methods provided herein. For example, the network node can include a proxy service and a software container that is configured to execute a smart contract for providing a web service according to the methods provided herein.

The foregoing and other described embodiments can each, optionally, include one or more of the following features:

A first feature, combinable with any of the following features, specifies that the web service request comprises a HyperText Transfer Protocol (HTTP) request, wherein the HTTP request comprises an HTTP address for the web data.

A second feature, combinable with any of the previous or following features, specifies that the web interface comprises HTTP-based application programming interface (API).

A third feature, combinable with any of the previous or following features, specifies that the web service comprises a web service written in Java, Go, or C/C++ computer programming language, and the software container comprises at least one of a JAVA server, a GO server, or a C/C++ server, respectively.

A fourth feature, combinable with any of the previous or following features, specifies that the software container comprises a DOCKER container.

A fifth feature, combinable with any of the previous or following features, specifies that the method further includes determining, by the blockchain network node, whether the client device is authorized to access the web data; wherein forwarding, by the blockchain network node, the web service request to a smart contract comprises forwarding the web service request to the smart contract in response to determining that the client device is authorized to access the web data.

A sixth feature, combinable with any of the previous or following features, specifies that the method further includes: storing, by the blockchain network node, information related to the smart contract in the blockchain network node, the information related to the smart contract including at least one of an identifier of the smart contract, a version number of the smart contract, or data that is called by the smart contract to generate the execution result.

A seventh feature, combinable with any of the previous or following features, specifies that the web service request comprises a request for static web data, and the static web data is stored in the blockchain network node, and the execution result in response to the web service request comprises the static web data retrieved by the smart contract.

A eighth feature, combinable with any of the previous or following features, specifies that the web service request comprises a request for static web data, and the static web data is stored in a distributed network server external to the blockchain network, and the execution result in response to the web service request comprises the static web data retrieved by the smart contract from the distributed network server.

A ninth feature, combinable with any of the previous or following features, specifies that the method further includes: broadcasting the request for modifying web data to a plurality of consensus nodes of the blockchain network; in response to a consensus procedure performed by the plurality of the consensus nodes, modifying, by the smart contract, the web data stored in the blockchain network node; and generating, by the smart contract, the execution result indicating the modifying of the web data stored in the blockchain network node.

A tenth feature, combinable with any of the previous or following features, specifies that the blockchain network node comprises a second smart contract deployed in a second software container on the blockchain network node for providing a second web service, wherein the second software container comprises a second standalone, executable package of software for executing the second smart contract in the second software container on the blockchain network node.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method for implementing a blockchain-based web service, the computer-implemented method comprising:

receiving, at a blockchain network node of a blockchain network and from a client device, a web service request for web data, wherein the web service request is sent by the client device to the blockchain network node using a web interface;

storing, by the blockchain network node, the web service request in the blockchain network node;

forwarding, by the blockchain network node, the web service request to a smart contract deployed in a software container on the blockchain network node for providing the web service, wherein the software container comprises a standalone, executable package of software for executing the smart contract in the software container on the blockchain network node;

obtaining, by the blockchain network node and from the smart contract, an execution result in response to the web service request; and sending, by the blockchain network node, the execution result to the client device using the web interface.

2. The computer-implemented method of claim 1, wherein the web service request comprises a HyperText Transfer Protocol (HTTP) request, wherein the HTTP request comprises an HTTP address for the web data.

3. The computer-implemented method of claim 1, wherein the web interface comprises HTTP-based application programming interface (API).

4. The computer-implemented method of claim 1, wherein the web service is written in Java, Go, or C/C++ computer programming language, and the software container comprises at least one of a JAVA server, a GO server, or a C/C++ server, respectively.

5. The computer-implemented method of claim 1, wherein the software container comprises a DOCKER container.

6. The computer-implemented method of claim 1, further comprising:
determining, by the blockchain network node, whether the client device is authorized to access the web data; and
wherein forwarding, by the blockchain network node, the web service request to the smart contract comprises forwarding the web service request to the smart contract in response to determining that the client device is authorized to access the web data.

7. The computer-implemented method of claim 1, further comprising:
storing, by the blockchain network node, information related to the smart contract in the blockchain network node, the information related to the smart contract comprising at least one of an identifier of the smart contract, a version number of the smart contract, or data that is called by the smart contract to generate the execution result.

8. The computer-implemented method of claim 1, wherein:
the web service request comprises a request for static web data, and the static web data is stored in the blockchain network node, and
the execution result in response to the web service request comprises the static web data retrieved by the smart contract.

9. The computer-implemented method of claim 1, wherein:
the web service request comprises a request for static web data, and the static web data is stored in a distributed network server external to the blockchain network, and the execution result in response to the web service request comprises the static web data retrieved by the smart contract from the distributed network server.

10. The computer-implemented method of claim 1, wherein the web service request comprises a request for modifying web data stored in the blockchain network node, the method further comprising:
broadcasting the request for modifying web data to a plurality of consensus nodes of the blockchain network;
in response to a consensus procedure performed by the plurality of the consensus nodes, modifying, by the smart contract, the web data stored in the blockchain network node; and
generating, by the smart contract, the execution result indicating the modifying of the web data stored in the blockchain network node.

11. The computer-implemented method of claim 1, wherein the blockchain network node comprises a second smart contract deployed in a second software container on the blockchain network node for providing a second web service, wherein the second software container comprises a second standalone, executable package of software for executing the second smart contract in the second software container on the blockchain network node.

12. A system for implementing a blockchain-based web service, comprising:
one or more processors; and
one or more computer-readable devices coupled to the one or more processors and having tangible, non-transitory, machine-readable media storing one or more instructions that, when executed by the one or more processors, perform operations comprising:
receiving, at a blockchain network node of a blockchain network and from a client device, a web service request for web data, wherein the web service request is sent by the client device to the blockchain network node using a web interface;
storing, by the blockchain network node, the web service request in the blockchain network node;
forwarding, by the blockchain network node, the web service request to a smart contract deployed in a software container on the blockchain network node for providing the web service, wherein the software container comprises a standalone, executable package of software for executing the smart contract in the software container on the blockchain network node;
obtaining, by the blockchain network node and from the smart contract, an execution result in response to the web service request; and
sending, by the blockchain network node, the execution result to the client device using the web interface.

13. The system of claim 12, wherein the web service request comprises a HyperText Transfer Protocol (HTTP) request, wherein the HTTP request comprises an HTTP address for the web data.

14. The system of claim 12, wherein the web interface comprises HTTP-based application programming interface (API).

15. The system of claim 12, wherein the web service is written in Java, Go, or C/C++ computer programming language, and the software container comprises at least one of a JAVA server, a GO server, or a C/C++ server, respectively.

16. The system of claim 12, wherein the software container comprises a DOCKER container.

17. The system of claim 12, the operations further comprising:

determining, by the blockchain network node, whether the client device is authorized to access the web data; and wherein forwarding, by the blockchain network node, the web service request to the smart contract comprises forwarding the web service request to the smart contract in response to determining that the client device is authorized to access the web data.

18. The system of claim 12, the operations further comprising:

storing, by the blockchain network node, information related to the smart contract in the blockchain network node, the information related to the smart contract comprising at least one of an identifier of the smart contract, a version number of the smart contract, or data that is called by the smart contract to generate the execution result.

19. The system of claim 12, wherein:

the web service request comprises a request for static web data, and the static web data is stored in the blockchain network node, and the execution result in response to the web service request comprises the static web data retrieved by the smart contract.

20. A non-transitory, computer-readable medium storing one or more instructions executable by a computer system to perform operations comprising:

receiving, at a blockchain network node of a blockchain network and from a client device, a web service request for web data, wherein the web service request is sent by the client device to the blockchain network node using a web interface;

storing, by the blockchain network node, the web service request in the blockchain network node;

forwarding, by the blockchain network node, the web service request to a smart contract deployed in a software container on the blockchain network node for providing the web service, wherein the software container comprises a standalone, executable package of software for executing the smart contract in the software container on the blockchain network node;

obtaining, by the blockchain network node and from the smart contract, an execution result in response to the web service request; and sending, by the blockchain network node, the execution result to the client device using the web interface.

* * * * *